Feb. 21, 1950  F. N. SMITH  2,498,013
BELT CONVEYER IDLER ROLLER
Filed July 11, 1947  2 Sheets-Sheet 1

FRANKLIN N. SMITH, Inventor

By McMorrow, Berman + Davidson
Attorneys

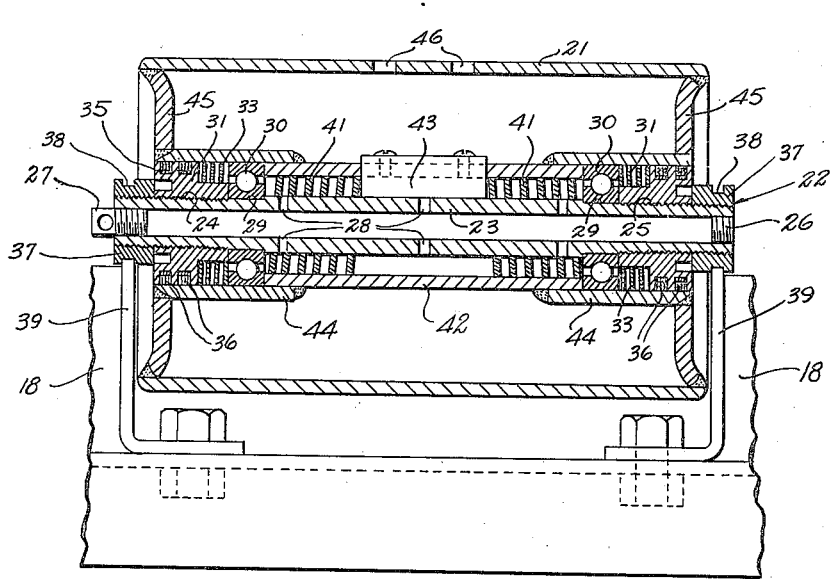
FIG. 2.
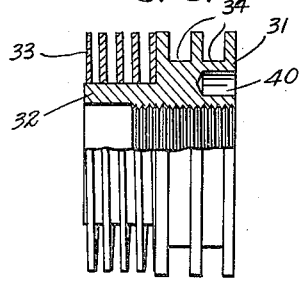
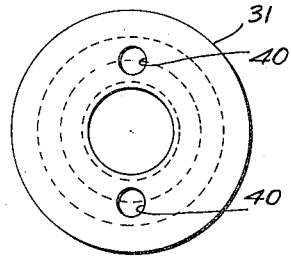
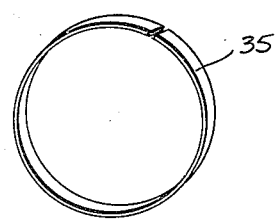
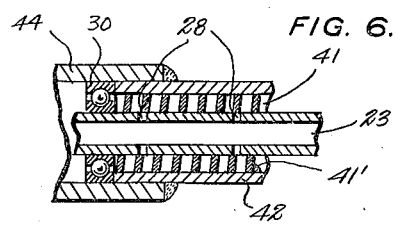
Inventor
FRANKLIN N. SMITH, Patented Feb. 21, 1950

2,498,013

UNITED STATES PATENT OFFICE 2,498,013

BELT CONVEYER IDLER ROLLER

Franklin N. Smith, Aurora, Ill.

Application July 11, 1947, Serial No. 760,253

5 Claims. (Cl. 308—20)

1

This invention relates to belt conveyors, and more particularly to idler rollers for belt conveyors.

A main object of the invention is to provide a novel and improved idler roller device for belt conveyors which is very simple in structure, smooth in operation and efficient in performance.

A further object of the invention is to provide an improved idler roller for belt conveyors which is very easy to lubricate, provides an efficient and automatic distribution of lubricant therein and operates in a substantially frictionless and noiseless manner even under conditions of heavy loading.

Further objects and advantages of the invention will become apparent from the following description and claims, and from the accompanying drawings, wherein:

Figure 2 is an enlarged longitudinal cross-sectional view taken through the central upper idler roller of Figure 1.

Figure 3 is an enlarged elevational detail view, partly in cross-section, of a baffle nut employed in the structure of Figure 2.

Figure 4 is an end view of the baffle nut of Figure 3.

Figure 5 is an enlarged perspective view of an expansion ring employed in the structure of Figure 2.

Figure 6 is a fragmentary cross-sectional detail view illustrating an alternative embodiment of the invention.

Figure 1:
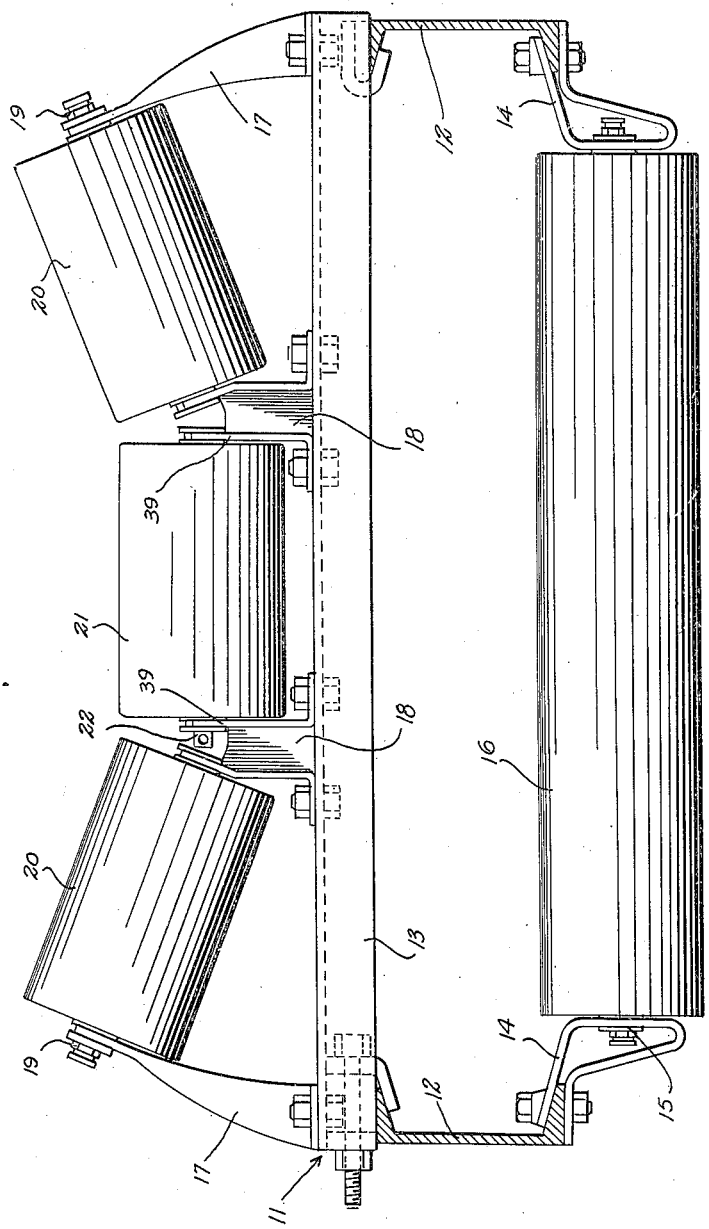
Figure 1 is a transverse cross-sectional view taken through a belt conveyor roller support, illustrating a plurality of idler rollers constructed according to the present invention.

Referring to the drawings, 11 designates generally a belt conveyor support structure, said support structure comprising a pair of longitudinal channels 12, 12 to the top flanges of which are secured a plurality of transverse supports 13. Supported by suitable hangers 14, 14 secured to the bottom flanges of channels 12, 12 is the shaft 15 on which is journaled the belt return roller 16. Secured to the end portions of each transverse support 13 are the inwardly inclined upstanding brackets 17, 17 and secured to the intermediate portions of support 13 are spaced upstanding brackets 18, 18. Non-rotatively supported in the opposed top portions of the respective pairs of brackets 17 and 18 are the inclined shafts 19, 19, on each of which is journaled a roller 20. A similar roller 21 is journaled on a horizontal shaft 22 non-rotatively supported on the opposed inner top portions of the brackets 18, 18 between the rollers 20, 20, the aligned set of rollers 20 and 21 defining a trough-like rolling supporting means for a conveyor belt moving thereon parallel to the direction of channels 12, 12.

2

The idler rollers 16, 20, 20, and 21 are generally similar in structure except that return roller 16 is much longer than the top rollers 20, 20 and 21. This structure is illustrated in Figure 2 wherein the detailed components of the intermediate top roller 21 are shown by way of example.

In Figure 2, the roller shaft 22 comprises a tubular member 23 formed with respective right and left hand threads at its ends, as shown at 24 and 25. Into one end of the tubular member 23 is threaded a plug 26 and into the other end is threaded a grease fitting 27. Member 23 is formed along its length with a plurality of apertures, shown at 28. Adjacent each of the threaded portions 24 and 25 the tubular member 23 is formed with a shouldered seat 29 on which is positioned a ball bearing assembly 30. Threaded on the respective thread portions 24 and 25 are baffle nuts 31, each baffle nut having an inner reduced portion 32 bearing on the inner race of a ball bearing assembly 30. Secured to said reduced portion 32 is a helicoid spring 33 whose outer periphery is substantially flush with the outer periphery of the main body of the baffle nut and with the outer periphery of the outer race of the ball bearing assembly 30. The body of the baffle nut 31 is formed with a pair of annular grooves 34, 34 in each of which is positioned an expansive resilient metal ring 35 and a rawhide washer 36 which is pressed outwardly by the ring 35. Threaded on the outer portion of each of the threads 24 and 25 is a lock nut 37 which is formed with a groove 38. Groove 38 is of non-circular peripheral shape, such as hexagonal peripheral shape, and seats in a correspondingly shaped notch formed in the vertical inner flange portion 39 of the adjacent bracket 18, whereby the shaft structure 22 is non-rotatively supported at each end thereof on the brackets 18, 18.

The baffle nuts 31 are formed at their outer faces with recesses 40 to receive the lugs of a spanner wrench.

The helicoid springs 33 are in opposed right and left hand relationship at the respective ends of the shaft structure 22.

Secured to the inner portions of the tubular member 23 adjacent the respective ball bearing assemblies 30, 30 are helicoid springs 41, 41, said springs being respectively in opposed left and right hand relationship. Rotatively surrounding the said springs and enclosing the inner portion of tubular member 23 is a sleeve 42 to the intermediate portion of which is secured an inwardly extending booster bar 43. The end edges of the booster bar 43 are in rotative abutment with the respective inner end coils of the helicoid springs 41, 41, said bar acting to impel lubricant outwardly through said springs responsive to the rotation of sleeve 42, toward the respective bearing assemblies 30, 30. Secured to the ends of sleeve 42 and surrounding the bearing assemblies 30 and the baffle nuts 31 are sleeve members 44, 44 to which are secured the end walls 45, 45 of the roller 21. The rawhide washers 36, 36 sealingly engage the inside surfaces of the respective sleeve members 44, 44 to prevent the escape of lubricant outwardly past the baffle nuts 31, 31.

The lubricant is admitted into the tubular member 23 through the fitting 27 and flows outwardly through the openings 28, the flow of lubricant toward the bearing assemblies 30, 30 being promoted by the impeller action of the booster bar 43 and rotating flat helicoid springs 41, rotatable with the roller 21 about the fixed shaft 23. The grease or lubricant is pressed by the booster bar 43 into the space between adjacent convolutions of the spring 41, where it is threadably forced outwardly toward the bearings 30. The excess grease is moved through the outer opening 28, through the tubular member 23 and back to the space between the tubular member 23 and the sleeve 42, through the inner openings 28. Movement of the lubricant toward the ball bearing assemblies 30, 30 is thus assured.

Openings 46, 46 are provided in the roller 21 for inserting a tool to unfasten the securing bolts of the booster bar 43 when the roller is to be disassembled for cleaning or repair.

As an alternative arrangement, the booster bar may be omitted and the inner ends of springs 41, 41 may be secured to the sleeve 42 and 41', as shown in Figure 6, the outer ends of said springs being left free, so that the springs 41, 41 rotate with sleeve 42 and provide the required lubricant impeller action to feed lubricant outwardly toward the bearing assemblies 30.

While a specific embodiment of an idler roller structure for belt conveyors has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. An idler roller structure for belt conveyors comprising an apertured tubular shaft, a ball bearing assembly mounted on each end portion of the shaft, a nut member secured to each end portion of the shaft outwardly adjacent each bearing assembly, a helical spring secured to the nut member and abutting on the bearing assembly, a roller having an inner axial sleeve surrounding and rotatively engaging the nut members, and an impeller element carried at the intermediate portion of the sleeve and projecting internally thereof toward said apertured tubular shaft.

2. An idler roller structure for belt conveyors comprising an apertured tubular shaft, means for admitting lubricant into said shaft, a ball bearing assembly mounted on each end portion of the shaft, a nut member secured to each end portion of the shaft outwardly adjacent each bearing assembly, a helical spring secured to each nut member and abutting on the adjacent bearing assembly, the springs being coiled in opposite directions, a roller having an inner co-axial sleeve surrounding and rotatively engaging the nut members, and an impeller element carried at the intermediate portion of the sleeve and projecting internally thereof toward said apertured tubular shaft.

3. An idler roller structure for belt conveyors comprising an apertured tubular shaft, means for admitting lubricant into said shaft, a ball bearing assembly mounted on each end portion of the shaft, a nut member secured to each end portion of the shaft outwardly adjacent each bearing assembly, resilient means secured to each nut member and abutting the adjacent bearing assembly, a helicoidal spring secured to the shaft at each end portion inwardly adjacent a bearing assembly and extending around the shaft and inwardly toward the intermediate portion thereof, the springs being coiled in opposite directions, a roller having an inner co-axial sleeve surrounding and rotatively engaging the nut members, and an impeller element carried at the intermediate portion of the sleeve and projecting internally thereof between the inner ends of the springs toward said apertured tubular shaft.

4. An idler roller structure for belt conveyors comprising an apertured tubular shaft, means for admitting lubricant into said shaft, a ball bearing assembly mounted on each end portion of the shaft, a nut member secured to each end portion of the shaft outwardly adjacent each bearing assembly, resilient means secured to each nut member and abutting the adjacent bearing assembly, a helicoidal spring secured to the shaft at each end portion inwardly adjacent a bearing assembly and extending around the shaft toward the intermediate portion thereof, the springs being coiled in opposite directions, a roller having an inner co-axial sleeve surrounding and rotatively engaging the nut members, deformable packing means between the nut members and said co-axial sleeve, and an impeller element carried at the intermediate portion of the sleeve and projecting internally thereof toward said apertured tubular shaft, the innermost coils of said springs bearing on the end edges of said impeller element.

5. An idler roller structure for belt conveyors comprising an apertured tubular shaft closed at one end and provided with a grease admission fitting at the other end, a ball bearing assembly mounted on each end portion of the shaft, a nut member secured to each end portion of the shaft outwardly adjacent each bearing assembly, a helicoidal spring encircling and secured to each nut member at one end and abutting the adjacent bearing assembly at its other end, another helicoidal spring secured to the shaft at each end portion thereof inwardly adjacent a bearing assembly and extending around the shaft toward the intermediate portion thereof, said helicoidal springs being coiled in opposite directions on the opposite sides of the mid-portion of the shaft, a roller having an inner co-axial sleeve surrounding and rotatively engaging the nut members, deformable packing means between the nut members and said coaxial sleeve, and an impeller element carried at the intermediate portion of the sleeve and projecting internally thereof toward said apertured tubular shaft, the innermost coils of the inner helicoidal springs bearing on the end edges of said impeller element.

FRANKLIN N. SMITH.

REFERENCES CITED

The following references are of record in the file of this patent:

UNITED STATES PATENTS

| Number | Name | Date |
| --- | --- | --- |
| Re. 16,337 | Edwards | Apr. 27, 1926 |
| 2,446,616 | Smith | Aug. 10, 1948 |